Patented Feb. 11, 1941

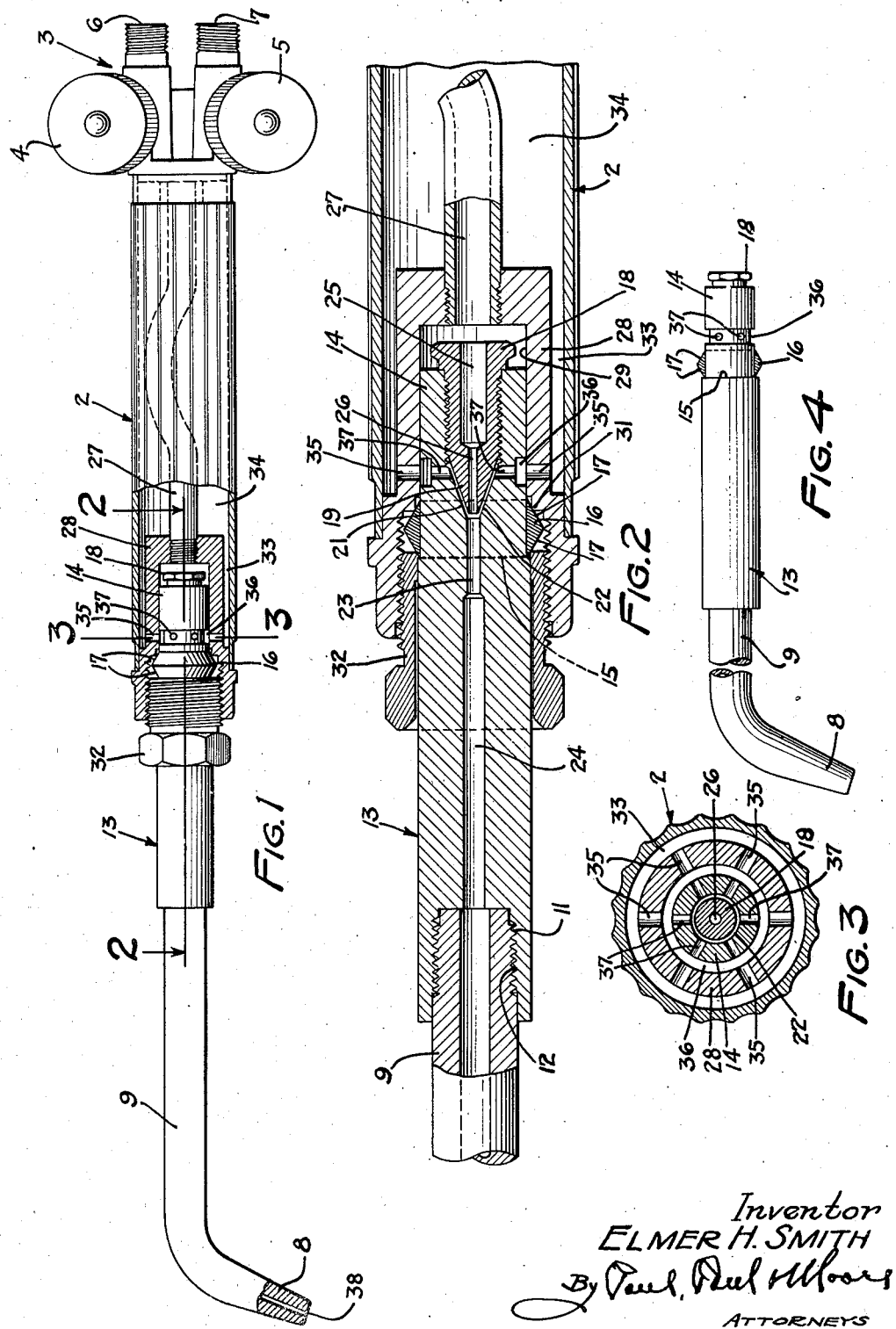

2,231,199

UNITED STATES PATENT OFFICE 2,231,199

TORCH

Elmer H. Smith, Minneapolis, Minn., assignor, by mesne assignments, to Smith Welding Equipment Corporation, Minneapolis, Minn., a corporation of Minnesota Application December 20, 1937, Serial No. 180,729

9 Claims. (Cl. 158—27.4)

This invention relates to new and useful improvements in cutting and welding torches.

An object of the present invention is to provide a cutting and welding torch provided with novel means for attaching the tip to the body thereof, without the use of tapered seats or bores, whereby the cost of manufacture is simplified.

A further object is to provide a torch of the character described comprising a handle portion having a head secured to one end thereof and provided with a cylindrical bore adapted to receive a corresponding shaped portion of the torch tip, and which cylindrical portion is secured in said bore in leak-proof relation by a conveniently operable clamping nut.

A more specific object of the invention is to provide a welding torch comprising a head having a cylindrical bore therein for slidably receiving a cylindrical end portion of the torch tip, the fit between the wall of said tip portion and the wall of the bore being such as to substantially prevent leakage of the gases between said walls, whereby the use of threads or a seat to keep the gases separate at this point may be entirely dispensed with, and the tip being so supported that it may readily be rotatively adjusted in said bore to position the outer offset or bent end portion of the tip at any desired angle with respect to the torch handle.

A further object is to provide a torch comprising a hollow body having one end adapted for connection to a source of oxygen, and a suitable fuel gas, and having a head secured to its opposite end and provided with a cylindrical bore having means connecting it to the oxygen and fuel supply, and the torch tip having a cylindrical portion adapted to be received in said bore and provided with an annular sealing ring adapted to be clamped between a shoulder provided at one end of the bore and a simple clamping nut, thereby to secure the torch tip to said body, and whereby the torch tip may be rotatively adjusted, and a suitable nozzle being provided at the inner end of said cylindrical portion which communicates with the oxygen supply, and a plurality of ducts being provided in the wall of said cylindrical portion adjacent the discharge end of said nozzle, whereby the oxygen and acetylene, or other fuel gas, may be delivered into the mixing chamber to provide a highly combustible fuel mixture, means being provided for independently controlling the supplies of oxygen and fuel gas to the torch tip.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Figure 1 is a side elevational view of a torch partially broken away to show the connection between the torch tip and the handle portion of the torch;

Figure 2 is an enlarged detail sectional view on the line 2—2 of Figure 1, to more clearly illustrate the means provided for detachably securing the torch tip to the torch body;

Figure 3 is a cross-sectional view on the line 3—3 of Figure 1; and

Figure 4 is a view showing the torch tip detached from the torch body.

In the selected embodiment of the invention here shown, there is illustrated in Figure 1, a welding torch of more or less conventional construction, comprising a hollow body 2, which preferably is fluted, as best illustrated in Figure 3, to provide a convenient hand grip. The handle 2 is provided at one end with a valve mechanism, generally indicated by the numeral 3, which comprises independently operable control valves 4 and 5 having threaded nipples 6 and 7, one of which is adapted to be connected to a supply of oxygen and the other to a supply of a suitable fuel gas such as acetylene, or any other fuel gas suitable for the purpose. In the present instance, I have shown the valve 4 as controlling the supply of oxygen to the torch tip and the valve 5 controlling the supply of fuel gas.

One of the important features of the present invention resides in the novel means provided for detachably securing the usual torch tip 8 to the body or handle 2 of the torch. As best illustrated in Figure 2, the torch tip 8 is composed of a tubelike member 9 having a threaded end portion 11 adapted to be secured in a threaded socket 12 provided at one end of a member, generally indicated by the numeral 13. This member is preferably cylindrical in cross-section, and has its inner end portion 14 slightly reduced in diameter to provide an annular shoulder 15 against which is seated an annular sealing ring 16, bored to snugly fit the reduced portion 14. The sealing ring 16 is preferably provided with oppositely disposed conical faces 17, as shown.

The inner end of the member 13 is interiorly threaded to receive a nozzle 18 having a conical tip 19 received in a correspondingly shaped bore 21 provided in the member 13. The walls of the bore 21 are spaced from the adjacent wall of the tip 19 to provide a fluid passage 22, communicating with one end of a bore 23 provided in the member 13. The opposite end of the bore 23 communicates with one end of a chamber 24, the opposite end of which is in direct communication with the fluid passage in the tube 9, which forms a part of the torch tip 8.

The nozzle 18 is detachably supported in the member 13 and has a bore 25, one end of which communicates with a small passage 26 provided in the tip of the nozzle. The bore 25 of the nozzle communicates with one end of a pipe 27, the opposite end of which is suitably connected to the intake nipple 6 through the oxygen control valve 4.

The cylindrical member 13 of the torch tip is adjustably and detachably supported in a head 28. This head is secured to one end of the hollow body 2 forming the torch handle, by such means as welding, and has a cylindrical bore 29 adapted to receive the inner reduced end portion 14 of the member 13. An annular seat 31 surrounds the mouth of the bore 29, and is adapted to be engaged by one side of the sealing ring 16, as clearly illustrated in Figure 2. The opposite side of the sealing ring is engaged by the inner end of a suitable clamping nut 32, received in threaded engagement with the head 28, as shown. By tightening the nut 32, the sealing ring 16 is clamped between the shoulder or seat 31 and the inner end of the nut 32, whereby it is compressed against the walls of the inner end portion 14 of the member 13, thereby to tightly seal the connection between the member 13 and head 28, to prevent leakage of the gases from the torch head to the atmosphere.

The inner end of the head 28 is relatively smaller in diameter than the bore of the handle or body 2 of the torch to provide an annular fluid passage 33 which is in communication with the chamber 34 provided within the body 2 of the torch. This chamber is also in communication with the nipple 7 through the valve 5, whereby the supply of fuel gas to the chamber 34 may be controlled by manipulation of the valve 5.

A plurality of lateral apertures 35 are shown provided in the wall of the head 28 which establish communication between the annular passage 33 and an annular groove 36 provided in the periphery of the cylindrical end portion 14 of the member 13. Lateral fluid passages 37 connect the groove 36 with the conical fluid passag 22 surrounding the tip of the nozzle 18.

Another feature of the invention resides in the construction of the parts 14 and 28. As best shown in Figure 2, the annular groove 36 is spaced outwardly in an axial direction from the inner end of the cylindrical portion 14 of the member 13 of the torch tip, thereby to increase the length of the fit of the end portion 14 in the bore 29, between the lateral passages 35—37 and the inner end of the portion 14. By thus outwardly spacing the groove 36 from the inner end of the portion 14, leakage of the two gases between the walls of the bore 29 and cylindrical portion 14 is substantially eliminated, because of the high resistance offered to gas flow between said walls. The cylindrical portion 14 is fitted within the bore 29 with sufficient clearance to permit free rotation thereof, when the nut 32 is operated, thereby to permit free rotary adjustment of the torch tip, whereby the offset or bent terminal 8 thereof may be positioned at any desired angle with respect to the torch body and handle. The aforementioned clearance however, is so small that the resistance offered to gas flow between the walls of the portion 14 and bore 29 is so great that leakage of the gases therebetween is substantially eliminated, even though there may be quite a difference in the pressures of the two gases.

From the foregoing, it will be seen that when the valves 4 and 5 are opened, oxygen and fuel gas will be delivered into the passage 23 of the member 13, where they are intermixed and then pass into the expansion chamber 24 for further mixing, thereby providing a highly combustible fuel mixture which may readily be ignited, when projected from the orifice 38 of the torch tip 8. The different gases may readily be controlled by manipulation of the valves 4 and 5, which are arranged for independent operation, whereby the most efficient economic fuel mixture may be obtained.

By utilizing the novel means herein disclosed for attaching the torch tip to the torch body, the tip may readily and conveniently be rotatably adjusted with respect to the torch body, by simply loosening the clamping nut 32, as will readily be understood. The reduced end portion 14 of the member 13 snugly fits the bore 29 of the head 28 and provides a relatively leak-proof joint without the use of additional seats, threads or tapered fits, as is now more or less common in structures of this general type. Also, by making the reduced end portion 14 of the member 13 and the bore 29 cylindrical, economy in manufacture is effected. It will also be noted that the annular shoulder 15 provided on the member 13 limits the movement of the sealing ring 16 in one direction, whereby the fluid passages 35 will always be alined with the annular groove 36 provided in the end portion 14 of the member 13, when the torch tip is attached to the body 2.

It is to be understood that the sealing ring 16 is preferably of a metal which may be contracted by pressure, whereby when clamped between the annular shoulder 31 and the clamping nut 32, it is compressed sufficiently to provide a tight fit on the reduced portion 14 of the member 13, so that it is not likely to become separated or detached therefrom, when the torch tip is removed from the torch body, as shown in Figure 4.

I claim as my invention:

1. A torch comprising a hollow body having means at one end for connecting it to supplies of oxygen and fuel gas, a head secured to the opposite end of said body and having a cylindrical bore therein, means connecting the inner end of the bore to the oxygen supply, a plurality of lateral fluid passages in said head spaced outwardly from the inner end of the bore, a torch tip having a cylindrical portion received in said bore between said lateral passages and the inner end of the bore, the diameter of said cylindrical portion being substantially three thousandths of an inch smaller than the bore, thereby permitting the torch tip to be relatively adjusted with respect to the torch body, and the fit between the wall of said cylindrical portion and the wall of the bore being such as to substantially prevent the leakage of gas therebetween.

2. A torch comprising a hollow body having a head secured to one end thereof, a cylindrical bore in said head, means connecting the inner end of said bore to a supply of oxygen, a lateral passage in said head communicating with a supply of fuel gas, said passage being spaced outwardly from the inner end of the bore, a torch tip having an end portion received in said bore and having a passage connecting said lateral passage with the interior of the torch tip, the diameter of said cylindrical end portion being between two and five thousandths of an inch less than the diameter of said bore, whereby the torch tip may be relatively adjusted in said bore, and the clearance between said walls being such that the resistance offered to the flow of gas therebetween is too great to permit gas leakage therethrough.

3. A torch comprising a hollow body forming the handle of the torch, a head secured to one end of said body and having a portion extending into the handle, said head having a cylindrical bore therein, means connecting the bottom of said bore to a supply of oxygen, a torch tip having an angularly disposed tip and provided at its opposite end with a cylindrical end portion adapted to be received in said bore, said cylindrical portion having a lateral fluid passage connected at one end with a supply of fuel gas, the opposite end of said passage communicating with a passage provided in the wall of the inwardly extending portion of the torch head, said lateral passages establishing communication between the supply of fuel gas and a gas passage provided within the torch tip, said lateral passages being spaced outwardly in an axial direction from the bottom of the bore, whereby the portiton of the cylindrical end of the torch tip received in said bore between the bottom of the bore and said lateral passage, is sufficiently long to prevent leakage of the gases between the wall of said end portion and the wall of the bore and the fit of said cylindrical end portion being such as to permit the torch tip to be rotatively adjusted with respect to the torch body.

4. A welding torch comprising a hollow body forming the handle of the torch, a head secured to one end of said body and having a portion extending into the handle, the diameter of which is relatively smaller than the bore of the handle, thereby to provide an annular passage around said inwardly extending portion which is connected to a source of fuel gas, said head having a cylindrical bore therein, means for connecting the bottom of said bore to a supply of oxygen, a torch tip having an angularly disposed tip and provided at its opposite end with a cylindrical end portion adapted to be received in said bore, said cylindrical portion having a plurality of lateral fluid passages communicating with similar passages provided in the wall of the inwardly extending portion of the torch head, said lateral passages establishing communication between the annular passage around the inwardly extending end portion of the torch head and a gas passage provided within the cylindrical end portion of the torch tip, said lateral passages being spaced outwardly in an axial direction from the bottom of the bore, whereby the portion of the cylindrical end of the torch tip received in said bore between the bottom thereof and said lateral passages is sufficiently long to prevent leakage of the gases between the wall of said end portion and the wall of the bore and whereby the torch may be rotatively adjusted with respect to the torch body, and means for securing the tip in adjusted position.

5. A torch comprising a handle member through which the oxygen and fuel gas supply pass, a head member fixed in one end of said handle member and having a screw threaded portion at one end and a cylindrical bore, said head member also having a plurality of fluid passages, a torch tip supporting member having a cylindrical portion with a reduced end portion extending into said bore in said head member, said cylindrical portion having a longitudinal passage for the gases and lateral passages to cooperate with the passages in the head member, sealing means provided around the reduced end portion adjacent the cylindrical portion, and clamping means in threaded engagement with the threaded portion of the head member to secure the supporting member against rotation relative to the handle in one position when the clamping means is tightened in its threaded engagement in the head member against the sealing means and to permit rotation of the reduced end portion of the cylindrical bore of the head member in another position thereof.

6. A torch comprising a handle member through which the oxygen and fuel gas supply pass, a head member fixed in one end of said handle member and having a screw threaded portion at one end and a cylindrical bore, said head member also having a plurality of spaced lateral fluid passages, a torch tip supporting member having a cylindrical portion with a reduced end portion extending into said bore in said head member, said cylindrical portion having a longitudinal passage for the gases and lateral passages to cooperate with the lateral passages in the head member, an annular sealing ring provided around the reduced end portion adjacent the cylindrical portion, and a threaded nut in threaded engagement with the threaded portion of the head member to secure the supporting member against rotation relative to the handle in one position when the nut is tightened in its threaded engagement in the head member against the sealing ring and to permit rotation of the reduced end portion of the cylindrical portion of the head member in the cylindrical bore of the head member in another position thereof.

7. A torch comprising a handle member through which the gaseous fluids pass, a head member fixed in one end of said handle member and being in communication with the gaseous fluids in the handle member, said head member having an engaging portion at one end and a cylindrical bore, a torch tip supporting member having a cylindrical portion with a longitudinal pasasge for the gases and a reduced end portion with an annular shoulder between the end and cylindrical portions, said supporting member being rotatably adjustable relative to the handle member by means of the reduced end portion freely rotating in the cylindrical bore, and readily releasable means cooperating with the engaging portion and the reduced end portion to secure the supporting member against rotation in the head member and to tightly seal the cylindrical portion of the supporting member and the head member to prevent leakage of the fluids from the torch.

8. A torch according to claim 7, in which the reduced portion is provided with an annular peripheral groove and the head member and reduced portion have a plurality of laterally spaced apertures and passages communicating with the groove for the passage of one of the gaseous fluids.

9. A torch according to claim 7, in which the reduced portion is provided with an annular peripheral groove and the head member and reduced portion have a plurality of laterally spaced apertures and passages communicating with the groove for the passage of one of the gaseous fluids, and in which the means includes an annular sealing ring provided adjacent the shoulder and in contact with the head member around the reduced portion.

ELMER H. SMITH.